Patented June 25, 1935

2,006,219

UNITED STATES PATENT OFFICE 2,006,219

BLANC FIXE

Howard S. McQuaid, Lakewood, Ohio, assignor to The Grasselli Chemical Company, Cleveland, Ohio, a corporation of Delaware No Drawing. Application February 17, 1934, Serial No. 711,731

2 Claims. (Cl. 23—122)

This invention relates to a process of making barium sulfate, and is particularly directed to a process wherein barium sulfide and ammonium sulfate are reacted to produce a substantially neutral barium sulfate, and to produce ammonium sulfide as a valuable by-product.

Precipitated barium sulfate or "blanc fixe" is used commercially as an extender for paint pigments, as body for printing inks, as a filler for rubber, and other uses similar to those of barytes.

It has been the practice to make blanc fixe in a variety of distinct processes, principal of which has been (1) from barium sulfide and sodium sulfate, which yields sodium sulfide as a by-product; (2) from barium chloride and sodium sulfate; (3) as a by-product from the barium peroxide process for making hydrogen peroxide; and (4) from barium sulfide and sulfuric acid, yielding hydrogen sulfide as a by-product.

The first of these methods, using barium sulfide and sodium sulfate and recovering sodium sulfide as a by-product, has been found very satisfactory for general purposes. This process yields an alkaline blanc fixe of small particle size and fair color which is fairly suitable for use as a rubber filler, or as a printing ink pigment. However, for use in rubber, where a very low alkalinity is desirable, the product must be washed. The occluded sodium compounds are held very strongly by the barium sulfate, and prolonged washing is required to reduce the alkalinity to a satisfactory point. If the excess alkali is neutralized with acid, the product has been found to be unsuitable for lithographic inks. Furthermore, it is well known that an acid process or acid treated blanc fixe will adversely affect the curing properties of the rubber stock in which it is compounded.

I have found that a greatly improved barium sulfate can be made by reacting barium sulfide with a substantially equivalent amount of ammonium sulfate under carefully controlled conditions. It is essential that no substantial excess of barium sulfide or ammonium sulfate be used as they are very difficult entirely to remove. The ammonium sulfide resulting from the reaction is largely separated, as by filtration with washing, and the slight remainder, unlike sodium sulfide, is volatilized when the product is dried. My product is more nearly neutral than those made heretofore, and because of the absence of occluded salts has a lower pH value than is obtainable by merely washing a blanc fixe made from barium sulfide and sodium sulfate.

In order to disclose my invention more fully, the following illustrative examples are given.

*Example 1.*—A 25.5° Bé. solution of barium sulfide at 148° F. was run into a 29° Bé. solution of ammonium sulfate at 120° F. in 60 minutes. The addition of barium sulfide solution was stopped at the point where a test sample from the strike showed no excess of either barium sulfide or ammonium sulfate. The final strike temperature was 115° F. The reaction slurry was filtered and the filtrate, ammonium sulfide, recovered. The filter cake was dried, which operation removed any traces of occluded ammonium sulfide. The yield of washed and dried blanc fixe was 16.25 pounds. The ammonium sulfide filtrate contained 5.4% $(NH_4)_2S$ and the recovery of ammonium sulfide was calculated to be 74%. There were appreciable volatilization losses of ammonia and hydrogen sulfide during the strike.

*Example 2.*—A 15.0° Bé. solution of barium sulfide at 76° F. was run into a 20.2° Bé. solution of ammonium sulfate at 74 F. in 45 minutes. The addition of barium sulfide solution was stopped at the point where a test sample from the strike showed no excess of either of the precipitating solutions. The final strike temperature was 80° F. The slurry was filtered and the filter cake dried. The yield was 8.75 pounds blanc fixe with a 98% recovery of ammonium sulfide as a 3.5% solution. The volatilization losses of ammonia and hydrogen sulfide were practically negligible at this strike temperature.

Some of the advantages of the invention will at once be apparent by reference to the following comparisons of the results of the foregoing examples with a standard lot of the product made according to the well known barium sulfide-sodium sulfate process.

|                   | Example 1 | Example 2 | Standard lot |
|-------------------|-----------|-----------|--------------|
| Alkalinity (%NaOH)| .006      | .008      | .043         |
| pH                | 6.8       | 6.8       | 7.8          |

The alkalinity was determined by titrating a hot water extract of the dried sample with $N/10$ $H_2SO_4$ to a methyl orange end-point. The pH was determined on a hot water extract with LaMotte indicators.

It will be seen from the foregoing that my new ammonium sulfate process gives a product of lower pH than the product made according to the prior known barium sulfide-sodium sulfate process. This is apparently due to the ready volatilization of the ammonium sulfide, resulting in less occluded alkali in the finished barium sulfate. My new product is also of equal color and when observed under the microscope appears to be smaller in particle size, which may be considered for some purposes as a distinct advantage.

Variations in the procedure of carrying out my new process will suggest themselves from the foregoing. I preferably strike at a liquor concentration and temperature at which the highest yield of barium sulfate can be obtained without an appreciable volatilization loss of ammonium sulfide. I have found also that the ammonium sulfide liquor, after concentration by distillation, constitutes a valuable by-product.

I claim:

1. In the manufacture of barium sulfate, the steps comprising reacting such quantities of barium sulfide and ammonium sulfate as to leave no substantial excess of either, and separating, washing and drying the precipitated barium sulfate to volatilize adsorbed ammonium sulfid.

2. In the manufacture of barium sulfate, the the steps comprising reacting substantially equivalent amounts of barium sulfide and ammonium sulfate, separating and recovering ammonium sulfide from the reaction mass, washing and drying the precipitated barium sulfate to obtain a product of low alkalinity and to volatilize adsorbed ammonium sulfid.

HOWARD S. McQUAID.